Figure 1:
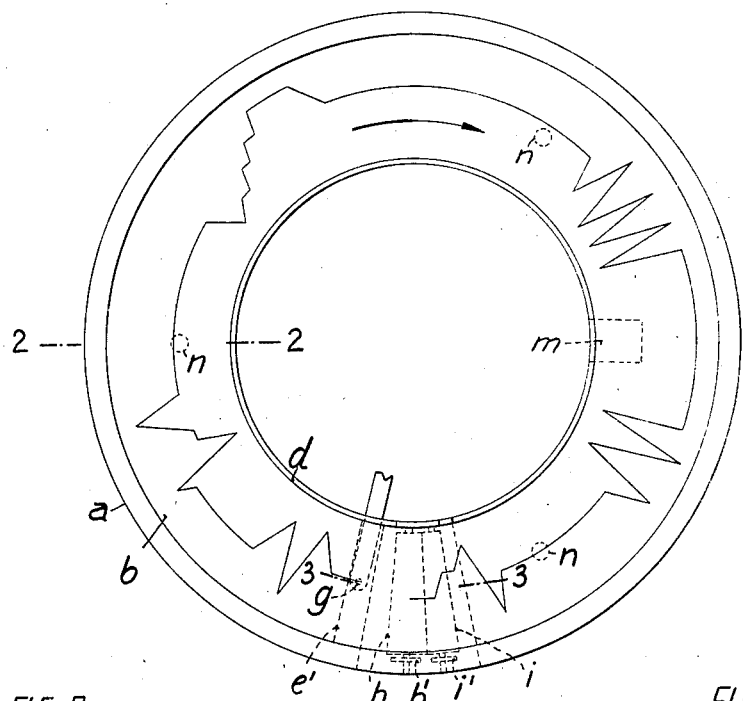

Aug. 21, 1928.

F. W. G. BRUHN 1,681,460

RECORDING DEVICE

Filed Feb. 1, 1927

Inventor:
F. W. G. Bruhn
by Marks & Clerk
Attys.

Patented Aug. 21, 1928.

1,681,460

UNITED STATES PATENT OFFICE.

FRIEDRICH WILHELM GUSTAV BRUHN, OF BERLIN-WILMERSDORF, GERMANY.

RECORDING DEVICE.

Application filed February 1, 1927, Serial No. 165,211, and in Germany December 16, 1926.

This invention relates to recording devices of the kind intended for recording or registering and controlling the length or the time of motion or way covered by a moving part, or self-contained arrangement and combination of parts, as for instance a motor car or a machine or the like. There are apparatus of this type in which, firstly, a permanent writing device is employed on which a curve indicating the speed or the length of the way is produced; and in which, secondly, a wiping member is provided, by which the record is made to disappear after a certain time, the two devices being moved relatively to each other by a driving gear pertaining to the apparatus.

The curve can be produced and rendered sufficiently accurate and distinct also by moving the stylus through a thin layer of a suitable plastic mass, for instance a colored fat, provided on a disk, and also the thus obtained record can in a completely mechanical manner be made to disappear by moving a smoothing member over it. This is the gist of the present invention. There may be provided only one smoothing member, or two more, preferably in the shape of a roller or rollers. If there are provided, for instance, two rollers, one of them is attached to the carrier of the layer of the plastic mass or colored fat, for instance to a rotatory disk, and the direction of rotation of that roller may be counter to that of said disk whereby the layer of the fat is lifted off the disk and is carried round by and with said roller and is then re-deposited uniformly upon the disk by, and on the other side of, the said roller.

In order to warrant reliable filling up of the furrow or groove drawn by the stylus, or, in other words, smoothing of the layer of fat or the like, the smoothing roller can be moved in a twofold manner, viz, rotated, as well as axially shifted, whereby the fat is distributed also radially. The fat is also in this case carried round the roller. This is a particularly reliable constructional form of the device; it operates very uniformly and is free from disturbances as neither the stylus, nor the fat-carrying disk are worn off in that the fat lubricates both members thoroughly. The fine furrow or groove drawn by the stylus can be seen distinctly even by a comparatively remote eye, and also disturbances by the action of the temperature upon the layer on the recording disk can be securely prevented in that a fat composition can be used that remains uniformly plastic through a large range of degrees of temperature, and besides, a filling material, as for instance, Cremnitz white, can be added to warrant that effect. A composition of this or similar kind is, therefore, particularly suited for recording apparatus installed on motor cars and flying machines.

Figure 2:
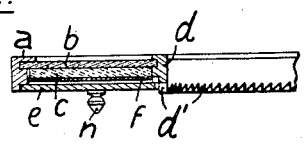
Figure 3:
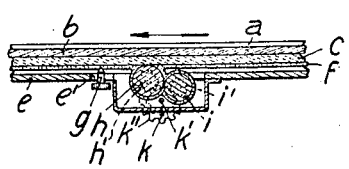

The invention is illustrated diagrammatically and by way of example on the accompanying drawing on which Figure 1 is a plan of a recording disk designed in the shape of a flat box, Figure 2 a section in the plane 2—2 of Fig. 1. Figure 3 a section in the plane 3—3, and Figure 4 a separate view of some parts of Fig. 3, drawn to a larger scale. Figures 1–3 are drawn in the natural scale.

On the drawing, $a$, Figs. 1 and 2, denotes a ring having a profiled section into which is inserted a transparent annular disk $b$. Below this annular disk or ring is another transparent annular disk or ring $c$ which is firmly connected with an inner ring $d$ also having profiled section, and having besides ratchet teeth $d'$ on its lower edge. These teeth mesh with a worm (not shown) located below the ring $d$, for instance at the place indicated by the letter $m$, and said worm is turned by suitable means, for instance and preferably by a speed indicator. The bottom surface of the annular disk $c$ is provided with a thin layer of a plastic mass, preferably a fat of suitable consistency, especially neat's-foot oil, to which has been admixed a pigment dye, for instance Cremnitz white. Below this layer is an annular closing disk affixed to the profile ring $a$. The whole forms, as appears especially from Fig. 2, a flat annular self-contained box that can be inserted into the casing of a clock or a speed meter or any other measuring device. The just-mentioned box may have grooved projections $n$ adapted to be pressed into snugly fitting cavities or recesses provided in the respective measuring device or the like whereby the said box can be easily and conveniently attached to, and detached from, the same.

The closing disk or bottom disk $e$ has a radial slot $e'$ through which extends a stylus $g$ that pertains to respective measuring device by which it is moved radially with respect to the annular layer of fat $f$ adhering to the ring c. The indications appear, therefore, in the form of a furrow or groove cut into the fat etc. by the stylus, that furrow or groove constituting a more or less broken curve, as the case may be; an example is shown in Fig. 1. The curve can be seen from the front of the flat box (formed by the members b, a, e, d) because the rings b and c are transparent, or consist of glass respectively. If the inner surface of the bottom ring e is painted dark, the fine curve can be seen distinctly also if the eyes are comparatively remote from the device.

Figure 4:
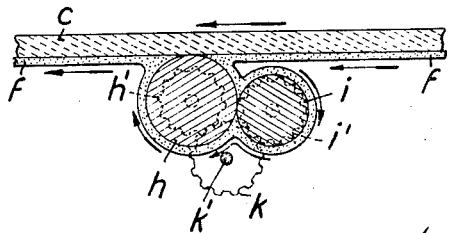

Now, in order to make the curve disappear after a certain time a roller h, preferably of conical shape, as in Fig. 1, is so arranged at the flat box as to lie radially with respect to the same and to contact with the ring c, as in Figs. 3 and 4. The roller h is located just in front of the stylus g and is rotated by a gearing comprising a cog-wheel k'' meshing with the teeth d' of the profiled inner ring d of the box, a shaft k' to which said wheel k'' is affixed, a cog-wheel k also secured to the shaft k', and another cog-wheel h' meshing with the wheel k and being connected with the roller h. The direction of rotation of the roller h is counter to that of the box (see the arrows in Fig. 4), in consequence whereof the fat etc. arriving at the roller passes over from the ring e to the roller and is carried by this latter to the other side where it is conducted back to and upon the ring c forming upon it again a thin layer f, without any furrow or groove or curve portion in it. But a fresh curve in the shape of a furrow or groove is then drawn by the stylus g.

In order to render the conveyance of the fat from the end of the finished curve to the commencement of the new curve as uniformly as possible, especially as regards the smoothness of the layer formed by the fat, the roller may be moved also axially while being rotated; or an auxiliary roller i, Figs. 3 and 4, may be provided which contacts, however, only with the roller h, but not with the ring c and the layer of fat f on it, as shown in Fig. 4. The roller i is connected with a cog-wheel i' meshing with the cog-wheel k whereby the roller i is rotated in the proper direction. The fat is now carried round by and over both rollers (h and i), as shown in Fig. 4. The circumferential speed of the roller h is, preferably, a little greater than that of the ring c, or of the entire box respectively.

The stylus is carried, preferably, by an elastic member warranting secure penetration of the fat and uniform pressure of the stylus upon the ring c.

I wish it to be understood that although I prefer the use of a plastic mass, such as fat, or the like, as "sheet" on, or into, which the stylus is writing, still also an organic or artificial composition may be employed consisting chiefly of soft, completely inelastic short hairs that are shoved by the stylus into a certain other position corresponding to the curve, and remain in that other position until the curve drawn in this way by the stylus is finished and the hairs are then acted on by the roller or rollers (h and i) whereby the curve is made to disappear just as with the fat or other plastic mass.

I claim:

1. A recording device, comprising, in combination, a rotatory transparent annulus and a thin layer of a plastic mass thereon, a stylus operated by the device penetrating into said layer and producing a curve therein, and a roller so arranged with respect to said annulus and the layer thereon as to be adapted to make the curve disappear and render the layer fit to receive another curve.

2. A recording device, comprising, in combination, a rotatory transparent annulus and a thin layer of a plastic mass thereon, a stylus operated by the device penetrating into said layer and producing a curve therein, a roller so arranged with respect to said annulus and the layer thereon as to be adapted to make the curve disappear and render the layer fit to receive another curve, and means for rotating said roller in a direction counter to that of said annulus.

3. A recording device, comprising, in combination, a rotatory transparent annulus and a thin layer of a plastic mass thereon, a stylus operated by the device penetrating into said layer and producing a curve therein, a roller so arranged with respect to said annulus and the layer thereon as to be adapted to make the curve disappear and render the layer fit to receive another curve, and another roller contacting with said first-mentioned roller, the two rollers being adapted to co-operate with each other and the annulus in this way that the plastic mass is withdrawn, by the first roller from the annulus, conveyed to the second roller, conveyed by this back to the first roller, and conveyed by this back to and upon the said annulus.

4. A recording device, comprising, in combination, a rotating transparent annulus and a thin layer of a plastic mass thereon, being adapted to receive a curve therein by means of a stylus operated by the device, and means before the stylus to take off the layer of plastic mass with the curve therein from the said annulus and to relay it thereto to have the curve to disappear and to render said layer fit to receive another curve.

In testimony whereof I affix my signature.

FRIEDRICH WILHELM GUSTAV BRUHN,